United States Patent
Suzuki (10) Patent No.: US 7,067,988 B2
(45) Date of Patent: Jun. 27, 2006

(54) INVERTER CIRCUIT FOR LIGHTING DISCHARGE LAMPS WITH REDUCED POWER CONSUMPTION

(75) Inventor: Shinichi Suzuki, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 136 days.

(21) Appl. No.: 10/891,578

(22) Filed: Jul. 15, 2004

(65) Prior Publication Data

US 2005/0023990 A1    Feb. 3, 2005

(30) Foreign Application Priority Data

Jul. 18, 2003  (JP) .............................. 2003-199387

(51) Int. Cl.
*H05B 37/02*  (2006.01)

(52) U.S. Cl. ................... 315/224; 315/209 R; 315/219

(58) Field of Classification Search ................ 315/224, 315/225, 276, 277, 307, 308, 219, 209 R, 315/DIG. 7, 244
See application file for complete search history.

(56) References Cited

U.S. PATENT DOCUMENTS

| | | | |
|---|---|---|---|
| 5,491,386 A | | 2/1996 | Eriguchi et al. |
| 6,114,814 A | * | 9/2000 | Shannon et al. ............ 315/219 |
| 6,377,000 B1 | * | 4/2002 | Kim ............................ 315/307 |
| 6,774,580 B1 | * | 8/2004 | Suzuki et al. ............... 315/224 |

FOREIGN PATENT DOCUMENTS

| | | |
|---|---|---|
| EP | 0 765 108 A | 3/1997 |
| JP | 2003-168585 | 5/1998 |

OTHER PUBLICATIONS

Trestman G A Ed - "Minimizing cost of HID lamp electronic Ballast" IEEE-2002, Nov. 5, 2002 (Nov. 5, 2002), pp. 1214-1218.

Chun-An Cheng et al: "A High Power Factor Electronic Ballast of Projector Lamps with Variable Frequency Control" IEEE-2002. Jun. 23, 2002 (Jun. 23, 2002), pp. 213-217.

* cited by examiner

*Primary Examiner*—Wilson Lee
(74) *Attorney, Agent, or Firm*—Wallenstein Wagner & Rockey, Ltd.

(57) ABSTRACT

An inverter circuit for lighting discharge lamps with reduced power consumption is disclosed. The inverter circuit comprises: a transformer having a resonant circuit formed by a parasitic capacitance of a discharge lamp; an H-bridge circuit to drive a primary side of the transformer at a frequency which is less than a series resonant frequency of the resonant circuit, and at which phase difference in voltage and current at the primary side of the transformer falls within a predetermined range from its minimum; a logic circuit to produce, based on an output signal of an oscillating circuit, gate signals for driving the H-bridge circuit; and a step-up circuit to step up a DC supply voltage (Vcc) based on another output signal of the oscillating circuit, and to supply the logic circuit with the stepped up DC voltage as a supply voltage for producing the gate signals.

6 Claims, 7 Drawing Sheets

INVERTER CIRCUIT FOR LIGHTING DISCHARGE LAMPS WITH REDUCED POWER CONSUMPTION

This application claims priority from Japan Application No. 2003-199387, filed Jul. 18, 2003 (incorporated by reference herein).

BACKGROUND OF THE INVENTION

1. Field of the Invention

The present invention relates to an inverter circuit for lighting discharge lamps for use in a liquid crystal display unit, and the like, and particularly to an inverter circuit with a high power efficiency.

2. Description of the Related Art

In some conventional inverter circuits for lighting discharge lamps, a resonant circuit may be formed by leakage inductance at the secondary side of a transformer and by parasitic capacitance in a discharge lamp connected as load, and the primary side of the transformer may be driven by a resonant frequency of the resonant circuit thus formed. An example of such inverter circuits is disclosed in U.S. Pat. No. 6,114,814. Such a conventional inverter circuit to drive the primary side by the resonant frequency involves phase difference in voltage and current at the primary side of the transformer consequently failing to achieve a favorable power efficiency.

In order to cope with the problem described above, Japanese Patent Application Laid-Open No. 2003-168585 discloses an inverter circuit for discharge lamps, in which a transformer is driven in a frequency range where phase difference in voltage and current at the primary side of the transformer is small thereby providing a high power efficiency, whereby the power efficiency of the transformer is improved. The inverter circuit for discharge lamps disclosed in the aforementioned Japanese Patent Application Laid-Open No. 2003-168585 comprises: a transformer where a resonant circuit is formed by parasitic capacitance in a discharge lamp and auxiliary capacitance; and an H-bridge circuit where the primary side of the transformer is driven at a frequency which is less than a series resonant frequency of the resonant circuit, and at which phase difference in voltage and current at the primary side of the transformer falls within a predetermined range from its minimum, thus the power efficiency is improved.

In an inverter circuit for discharge lamps used in a liquid crystal television (TV) which is one example of liquid crystal display (LCD) units, a supply voltage ranges from 12 to 24V. For example, in a separate driving inverter which is described in connection with the aforementioned inverter circuit disclosed in Japanese Patent Application Laid-Open No. 2003-168585, and which uses a leakage magnetic flux type transformer, an inverter control IC to constitute a control section of the inverter circuit is operated by a supply voltage of 5.0V, and an H-bridge circuit with an FET to drive a transformer thereby lighting discharge lamps is operated by a voltage of 12 to 24V.

Recently, a liquid crystal TV is increasing in its screen size, and as many as 8 to 24 discharge lamps are employed in one liquid crystal TV, and also the length of discharge lamps is increased to, for example, 1300 mm. This results in increasing the power consumption up to 180 W. Accordingly, in case of a large-sized liquid crystal TV, its inverter circuit and its discharge lamps are responsible for most of the power consumption, and therefore the inverter circuit is required to be further improved in efficiency for reducing its power consumption.

In order to answer the above-described requirement for improved efficiency of an inverter circuit for discharge lamps, there is provided an inverter circuit in which a voltage supplied to the H-bridge circuit for lighting discharge lamps is increased from conventional 12 to 24V up to, for example, 120V. Since, current flowing in the FET can be reduced due to the increased supply voltage in the inverter circuit, loss due to on-resistance of the FET can be reduced, and also since current flowing in a primary winding of a transformer can be reduced, copper loss can be reduced. Thus, its efficiency is improved. Here, two supply voltages are involved: one is 120V supplied to the H-bridge for lighting the discharge lamps, and the other is 5V supplied to the inverter control IC. The withstand voltage of the FET of the H-bridge must be increased, and a high gate source voltage is required to drive the FET with a high withstand voltage. For example, if the withstand voltage of the FET of the H-bridge is set at 200V, the gate source voltage of the FET of the H-bridge must be 10V or higher. Consequently, the FET cannot be driven by a voltage of 5V supplied to the inverter control IC if used as it is supplied, and the voltage supplied must be stepped up by a discharge pump, a bootstrap, or a step-up DC-to-DC converter in order to duly drive the FET.

However, employing a step-up circuit like the aforementioned discharge pump, bootstrap, or step-up DC-to-DC converter complicates the circuit structure and increases the number of components. Also, another problem is that there is difference between frequency of an oscillating circuit to operate the H-bridge circuit and frequency of another oscillating circuit to operate the step-up circuit, which produces interference at a reference voltage of the inverter control IC thus interrupting a stable operation of the circuit.

SUMMARY OF THE INVENTION

The present invention has been made in light of the above problems, and it is an object of the present invention to provide an inverter circuit for lighting discharge lamps, which is simply structured, enables stable operation of a circuit, and which has a further enhanced efficiency thereby reducing power consumption.

In order to achieve the object, according to one aspect of the present invention, an inverter circuit for lighting discharge lamps comprises: a transformer having a resonant circuit formed by a parasitic capacitance of a discharge lamp; an H-bridge circuit to drive a primary side of the transformer at a frequency which is less than a series resonant frequency of the resonant circuit, and at which phase difference in voltage and current at the primary side of the transformer falls within a predetermined range from its minimum; a logic circuit to generate, based on an output signal of an oscillating circuit, gate signals for driving the H-bridge circuit; and a step-up circuit to step up a DC supply voltage based on another output signal of the oscillating circuit, and to supply the logic circuit with the stepped up DC supply voltage as a supply voltage for generating the gate signals. Thus, the step-up circuit does not require an oscillating circuit dedicated thereto reducing the number of components, whereby the high withstand voltage FET of the H-bridge circuit can be controlled by a simplified circuitry with reduced cost. Consequently, the supply voltage to the H-bridge circuit can be increased therefore enabling current flowing in the FET to be decreased thus reducing loss due to on-resistance of the FET with the simplified circuitry. Also, since the step-up ratio of the transformer can be decreased, current at the primary side of the transformer can be decreased and therefore copper loss can be reduced, whereby efficiency can be improved for reduction in power consumption. Further, since one oscillating circuit is provided for common use, interference generated at reference voltage is prevented thus achieving a stable circuit operation.

In the aspect of the present invention, the oscillating circuit may be formed by the parasitic capacitance of the discharge lamp and an auxiliary capacitance parallel-connected to the discharge lamp. Consequently, a desired oscillating frequency can be achieved easily according to the auxiliary capacitance.

In the aspect of the present invention, the step-up circuit may comprise: an error amplifier to output a voltage in accordance with an output voltage of the step-up circuit; and a PWM circuit to output a pulse voltage having a pulse width according to the voltage outputted from the error amplifier based on the output signal from the oscillating circuit. Consequently, a constant and stable voltage can be easily outputted.

In the aspect of the present invention, the step-up circuit may further comprise a slow-start circuit connected to the PWM circuit. Consequently, a transitional excess voltage is prevented from being generated at an output of the step-up circuit.

In the aspect of the present invention, the slow-start circuit provided in the step-up circuit may have a shorter rise time than a slow-start circuit to start the H-bridge circuit. Consequently, the logic circuit can rise up stably, and therefore the H-bridge connected to the logic circuit can also rise up stably.

And, in the aspect of the present invention, the inverter circuit may further comprise a protection circuit to stop an operation of the step-up circuit when detecting an abnormal circumstance at a side of the transformer provided with the discharge lamp.

Further, since a reference voltage circuit to supply circuits with reference voltages required by the circuits, a stable inverter circuit free from malfunction can be provided. And, in the inverter circuit according to the present invention, the transformer is driven at a frequency lower than a resonant frequency therefore avoiding influence of a high order frequency, which makes it to easier to design a transformer.

DETAILED DESCRIPTION OF THE PREFERRED EMBODIMENT

A preferred embodiment of the present invention will hereinafter be described with reference to the accompanying drawings.

Figure 1:
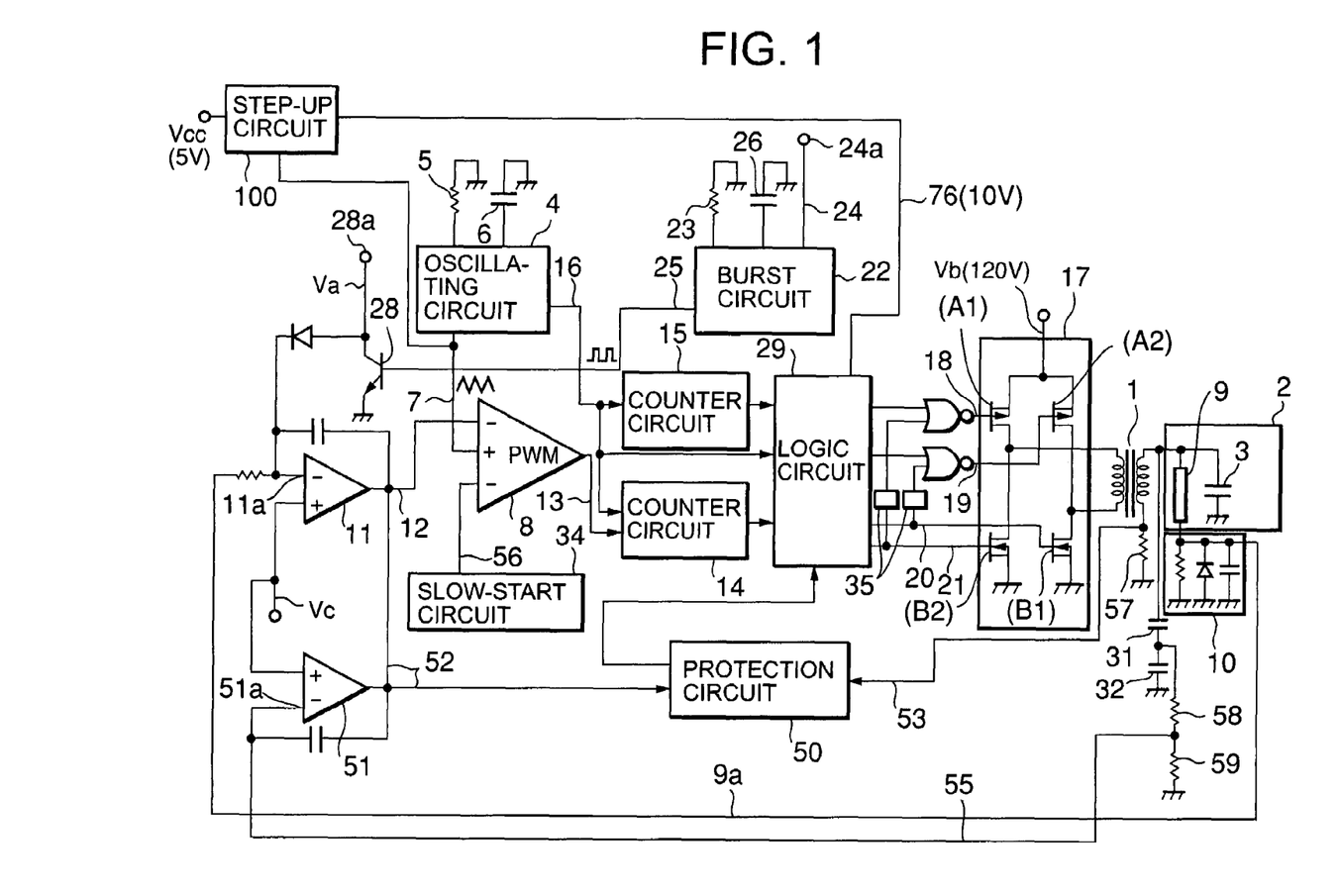
FIG. 1 is a block diagram of an inverter circuit for lighting discharge lamps, according to an embodiment of the present invention.

A block diagram of an inverter circuit for discharge lamps according to an embodiment of the present invention is shown in FIG. 1. For easier understanding, an explanation will be first made on a case where a predetermined voltage Va of a terminal 28a is not applied to an inverting input terminal 11a of an error amplifier 11 thus light modulation does not occur.

An output of a chopping wave 7 of an oscillating circuit 4 is inputted to a PWM circuit 8. A discharge lamp 9 for backlighting a liquid crystal display (LCD) is disposed in an LCD unit 2 provided at a secondary side of a transformer 1 (in practice, a plurality of discharge lamps and transformers are used, but only one each thereof is illustrated for the purpose of explanation), and its voltage 9a is inputted to the aforementioned inverting input terminal 11a of the error amplifier 11 by means of a current-to-voltage converter circuit 10 which converts current flowing in the discharge lamp 9 into voltage. A series oscillating circuit is formed by parasitic capacitance 3 at the discharge lamp 9, capacitors 31 and 32 connected to the discharge lamp 9 in parallel, and leakage inductance of the transformer 1. The capacitors 31 and 32 function as auxiliary capacitance for the parasitic capacitance 3.

The error amplifier 11 outputs to the PWM circuit 8 an output voltage 12 according to the current of the discharge lamp 9, and the PWM circuit 8 compares the chopping wave 7 and the output voltage 12 of the error amplifier 11 and inputs a pulse signal 13 to a counter circuit 14.

A slow-start circuit 34 outputs to the PWM circuit 8 an output signal of a start driving signal 56 for comparatively gentle rise-up, thereby preventing generation of an instantaneous overvoltage at the time of start.

The chopping wave 7 which is an output signal of the oscillating circuit 4 is determined by values of a resistor 5 and a capacitor 6, and an output pulse signal 16 of the oscillating circuit 4, which is synchronized with the chopping wave 7, is inputted to counter circuits 14 and 15, and a logic circuit 29. According to the output pulse signal 16 of the oscillating circuit 4 and output pulse signals of the counter circuits 14 and 15, the logic circuit 29 powered by a supply voltage 76 of 10V supplied from a step-up circuit 100 generates gate signals 18, 19, 20 and 21 with a pulse amplitude of 10V, which are to be inputted to an H-bridge circuit 17.

The H-bridge circuit 17 is structured such that a series circuit consisting of PMOS (A1) and NMOS (B2) and a series circuit consisting of PMOS (A2) and NMOS (B1) are connected to each other in parallel, and operates according to the gate signals 18, 19, 20 and 21. A DC supply voltage Vb of 120V for lighting the discharge lamp 9 is converted by the gate signals 18, 19, 20 and 21 with a pulse amplitude of 10V in the H-bridge circuit 17, and lights the discharge lamp 9 through the transformer 1.

Accordingly, when a burst circuit 22 does not operate thereby not allowing the predetermined voltage Va from the terminal 28a be applied to the inverting input terminal 11a of the error amplifier 11, light is not modulated, and the current of the discharge lamp 9 is inputted to the inverting input terminal 11a, thus the discharge lamp 9 is feedback-controlled and lighted.

Figure 2:
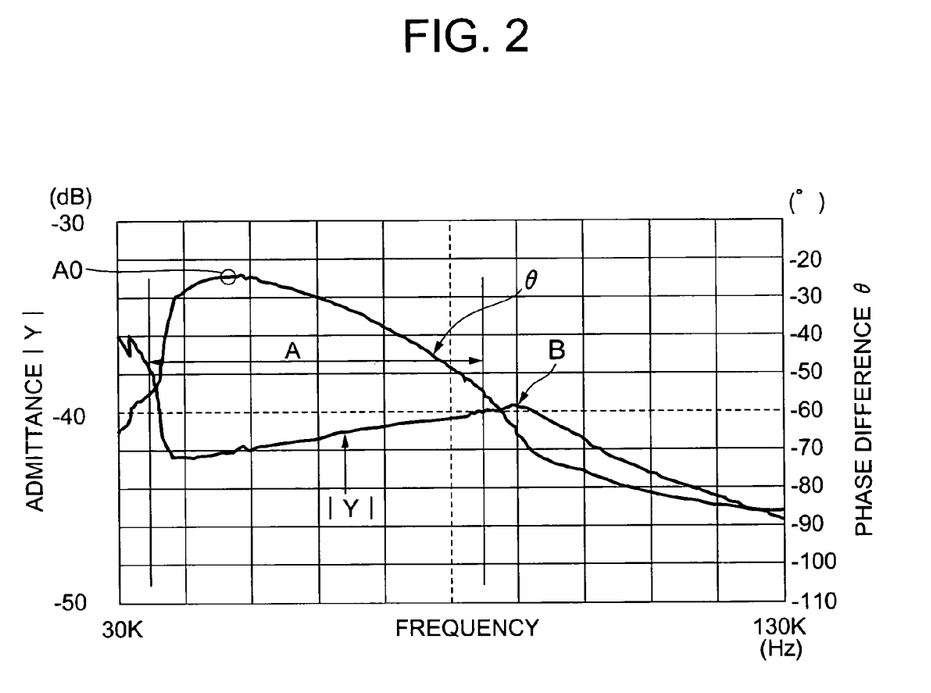
FIG. 2 is a graph showing a frequency characteristic of admittance /Y/ of a primary side of a transformer when a resonant circuit is formed at a secondary side thereof in the inverter circuit of FIG. 1, and showing another frequency characteristic of phase difference θ in voltage and current in the inverter circuit of FIG. 1.

Referring to FIG. 2, an AC current within a frequency indicated by A flows at the primary side of the transformer 1, and a constant current control is accomplished within a high power efficiency range to light the discharge lamp 9 shown in FIG. 1.

A discussion will now be made on an operation of the step-up circuit 100.

The step-up circuit 100 steps up a DC supply voltage Vcc of 5V, and supplies the stepped up DC voltage to the logic circuit 29 as the aforementioned supply voltage 76. The chopping wave 7, which is the output signal from the oscillating circuit 4, and which is used for controlling the H-bridge circuit 17, is inputted also to the step-up circuit 100.

Figure 3:
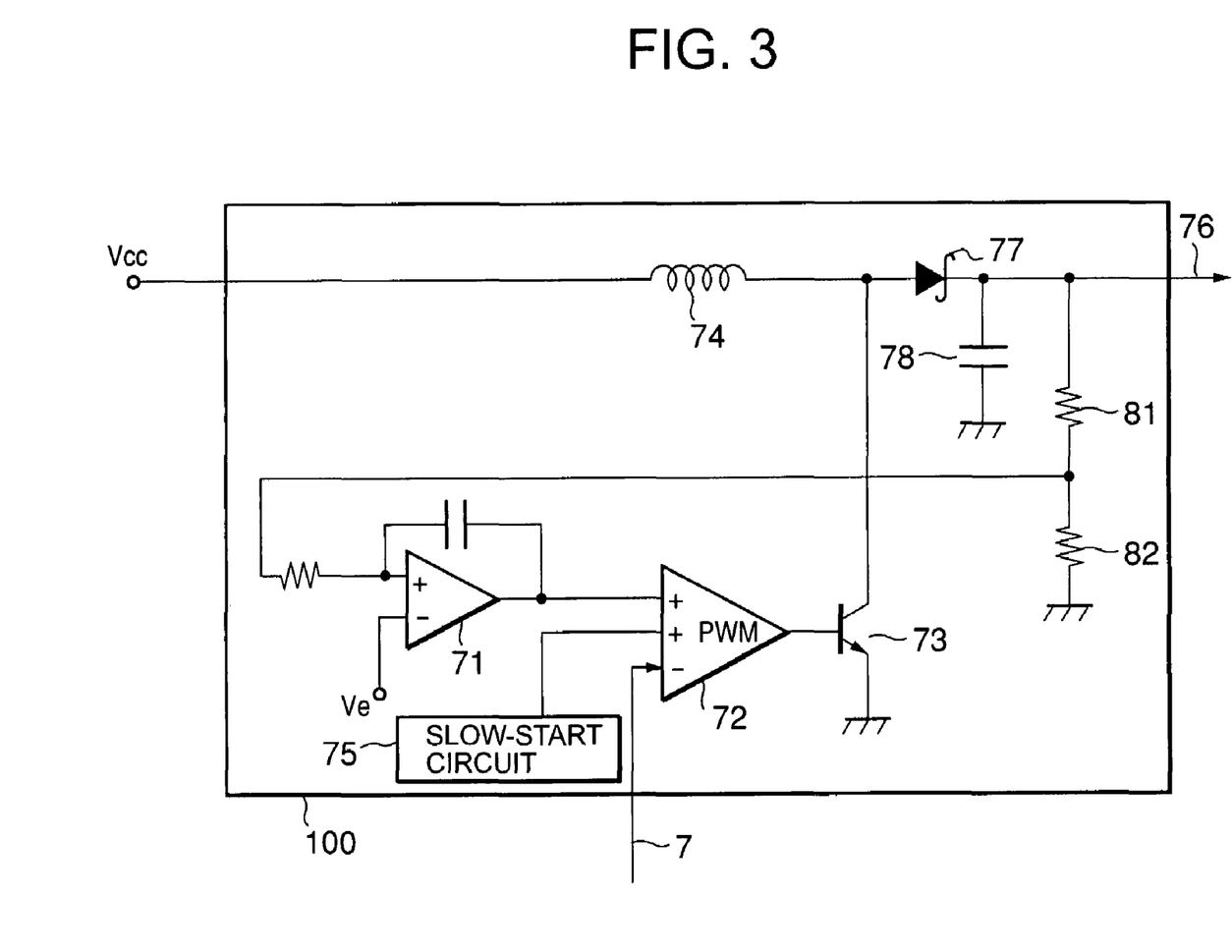
FIG. 3 is a block diagram of a step-up circuit in the inverter circuit of FIG. 1.

Referring to FIG. 3, the aforementioned DC supply voltage Vcc of 5V is applied to the step-up circuit 100, is stepped up by a step-up type chopper circuit formed by a transistor 73 to operate on the chopping wave 7, an inductor 74, and a diode 77, then is smoothed by a capacitor 78 into a DC voltage of 10V, and is outputted from the step-up circuit 100 as the DC supply voltage 76 for the logic circuit 29.

In the step-up circuit 100, PWM control is performed by using an error amplifier 71 and a PWM circuit 72, and a constant voltage output is achieved. An output voltage of the step-up circuit 100 is detected by resistors 81 and 82, and is compared with a reference voltage Ve by the error amplifier 71 which then outputs a voltage according to the output voltage of the step-up circuit 100. In the PWM circuit 72, the output of the error amplifier 71 is compared with the chopping wave 7 outputted from the oscillating circuit 4, and a pulse signal whose pulse width is feedback-controlled is outputted from the PWM circuit 72. This pulse signal makes the transistor 73 undergo switching, thereby outputting the DC supply voltage 76 of a constant voltage. Thus, the logic circuit 29 is provided with the supply voltage 76 and thereby enabled to output the gate signals 18, 19, 20 and 21 of a high voltage capable of driving an FET of high withstand voltage used in the H-bridge circuit 17.

Since the chopping wave 7 outputted from the oscillating circuit 4 is used in common for controlling the H-bridges circuit 17 and the step-up circuit 100, and shared by the both circuits, the step-up circuit 100 does not need to have an independent oscillating circuit dedicated thereto thus simplifying the circuitry of the step-up circuit 100. Also, since the H-bridge circuit 17 and the step-up circuit 100 share the use of the chopping wave 7 outputted from the oscillating circuit 4, the operating frequencies of the both circuits coincide with each other, whereby interference which occurs at a reference voltage when operating frequencies differ from each other can be avoided thus eliminating an instable circuit operation and ensuring a stable circuit operation.

A slow-start circuit 75 outputs to the PWM circuit 72 a signal to command comparatively gentle rise-up at the start of operation of the step-up circuit 100 so that the pulse signal outputted from the PWM circuit 72 is kept from having a too large width to thereby prevent generation of transitional excess voltage at the output of the step-up circuit 100.

Figure 4:
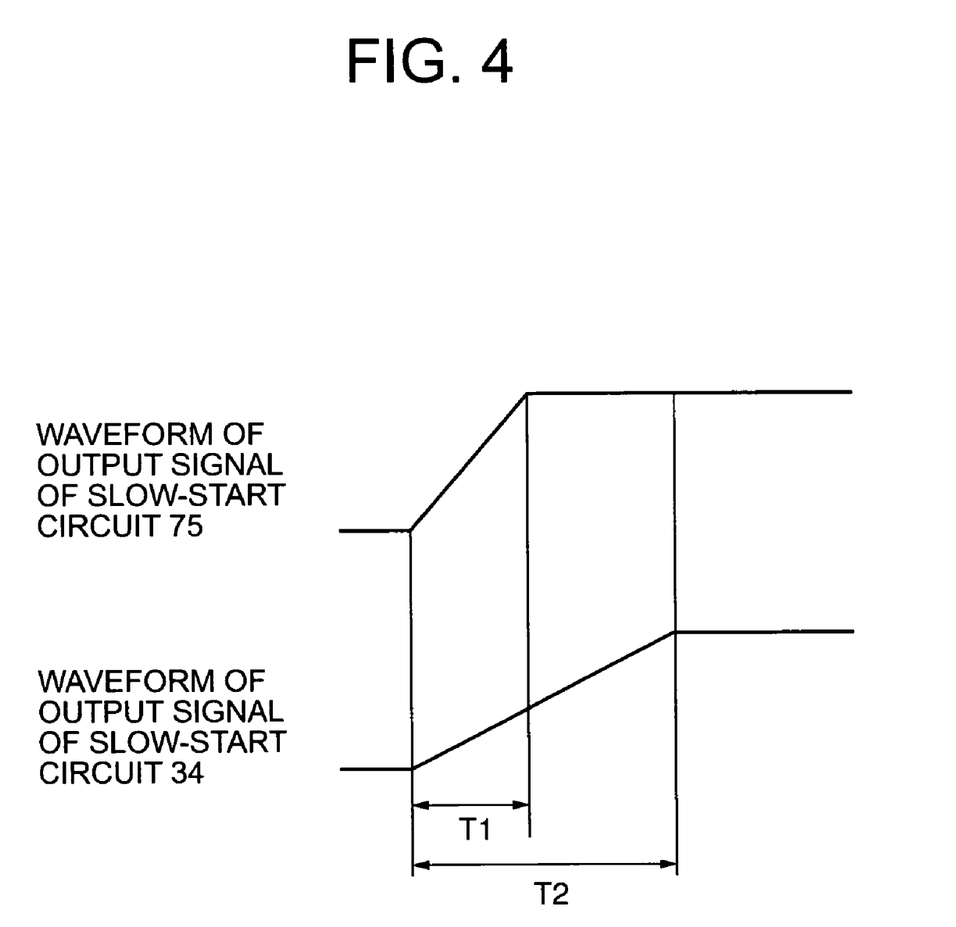
FIG. 4 is a waveform chart of output signals of respective slow-start circuits used in the step-up circuit and a PWM circuit in the inverter circuit of FIG. 1.

Referring to FIG. 4 showing a waveform chart of output signals of slow-start circuits 75 and 34 used in the step-up circuit 100 and the PWM circuit 8, respectively, in the inverter circuit of FIG. 1, a rise time T1 of the slow-start circuit 75 used in the step-up circuit 100 is set to be shorter than a rise time T2 of the slow-start circuit 34 used in the PWM circuit 8 so that the logic circuit 29 is allowed to rise up by the slow-start circuit 34 only after the supply voltage 76 is stabilized, whereby the logic circuit 29 can rise up stably, and therefore the H-bridge circuit 17 connected to the logic circuit 29 can also rise up stably.

An operation of the burst circuit 22 performing light control of the discharge lamp 9 will be described with reference to FIGS. 1 and 5A to 5E. Referring to FIG. 1, the burst circuit 22 can be set up in either of two modes: one mode is such that a resistor 23 has its resistance set at a predetermined value or more whereby a predetermined pulse signal 24 inputted to a DUTY terminal 24a is outputted from the burst circuit 22 as a first burst signal 25b (refer to FIG. 5D); and the other mode is such that the resistor 23 has its resistance set at less than a predetermined value whereby a chopping wave voltage 27 (refer to FIG. 5B) determined by the resistor 23 and a capacitor 26 is compared with a DC voltage 36 (refer to 5B) inputted to the DUTY terminal 24a thereby outputting a second burst signal (pulse wave) 25a (refer to FIG. 5C).

Figure 5A:
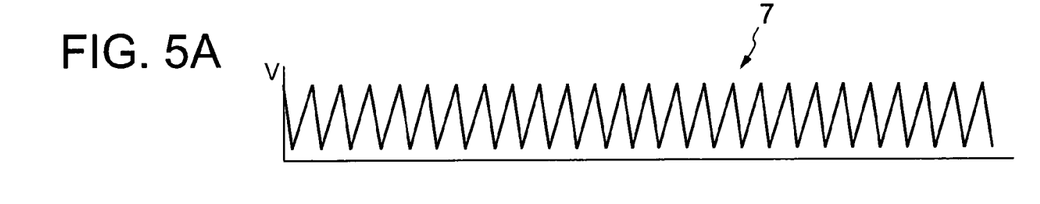
FIGS. 5A to 5E are operation timing charts on the inverter circuit of FIG. 1.
Figure 5B:
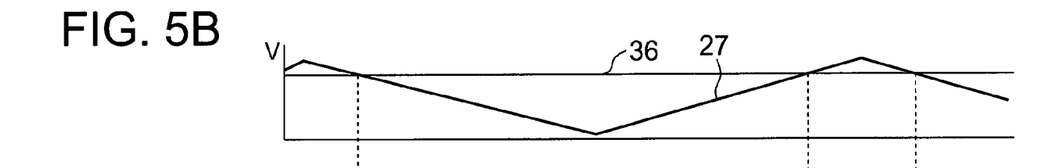
Figure 5C:
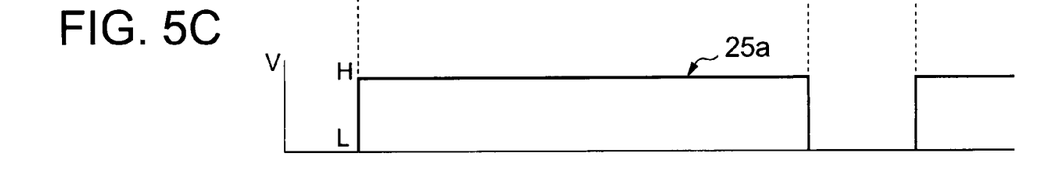
Figure 5D:
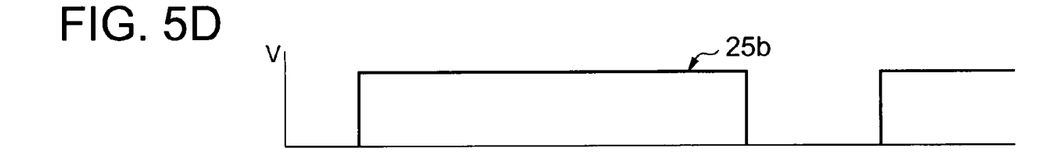
Figure 5E:
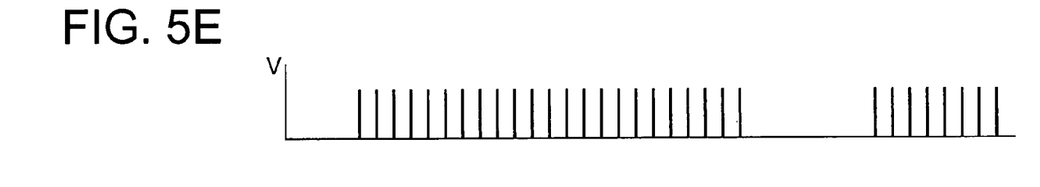

When the first burst signal 25b from the burst circuit 22 is "H", a transistor 28 is turned on causing the error amplifier 11 to output to the PWM circuit 8 an output voltage 12 in accordance with current in the discharge lamp 9, whereby an output (refer to 5E) of the H-bridge circuit 17 is formed based on the chopping wave 7 shown in FIG. 5A, which puts the discharge lamp 9 into operation. When the first burst signal 25b from the burst circuit 22 is "L", the transistor 28 is turned off causing the inverting input terminal 11a of the error amplifier 11 to be pulled up to the predetermined voltage Va supplied to the terminal 28a, whereby the error amplifier 11 is put in non-operation causing the H-bridge circuit 17 to stop its operation, which puts the discharge lamp 9 in non-operation. Thus, the discharge lamp 9 is caused to operate intermittently by the first burst signal 25b, and light control is performed. In this connection, when the second burst signal 25a is used, the discharge lamp 9 has it light controlled in the same manner, which allows selective usage of the first and second burst signals 25b and 25a.

Figures 6A, 6B:
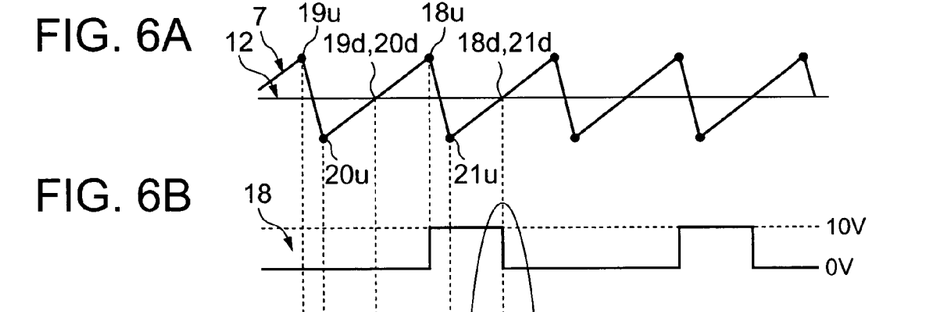
FIGS. 6A to 6F are timing charts of gate signals in the inverter circuit of FIG. 1.
Figure 6C:
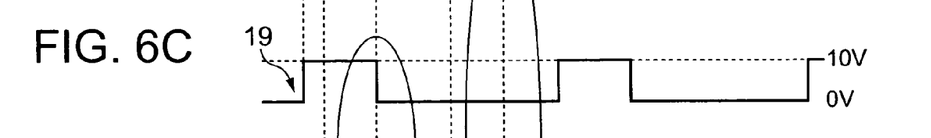

The gate signals 18 (refer to FIG. 6B) and 19 (refer to FIG. 6C), which are both formed at the logic circuit 29 by the supply voltage 76 from the step-up circuit 100, and which have a pulse amplitude of 10V, alternately rise up respectively at each upper peak 18u and 19u (refer to FIG. 6A) of the chopping wave 7 by means of counter circuits 14 and 15, and the logic circuit 29, and alternately fall down respectively at each cross point 18d and 19d (refer to FIG. 6A) of the chopping wave 7 and the output signal 12 of the error amplifier 11. Gates of the PMOS (A1) and the PMOS (A2) rise up and fall down respectively by the gate signals 18 and 19 having a pulse amplitude of 10V.

Figure 6D:
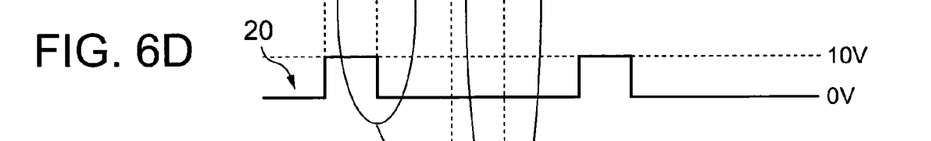
Figure 6E:
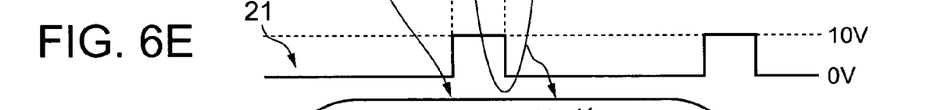

Also, the gate signals 20 (refer to FIG. 6D) and 21 (refer to FIG. 6E), which are both formed at the logic circuit 29 by the supply voltage 76 from the step-up circuit 100, and have a pulse amplitude of 10V, alternately rise up respectively at each lower peak 20u and 21u (refer to FIG. 6A) of the chopping wave 7 by means of the counter circuits 14 and 15, and the logic circuit 29, and alternately fall down respectively at cross each point 20d and 21d (refer to FIG. 6A) of the chopping wave 7 and the output signals 12 of the error amplifier 11. Gates of the NMOS (B1) and the NMOS (B2) rise up and fall down respectively by the gate signals 20 and 21 having a pulse amplitude of 10V.

Figure 6F:
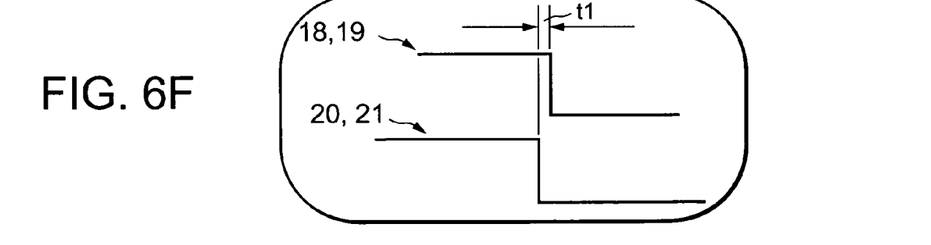

Referring to FIGS. 6B to 6E, the gate signals 21 and 20 rise up behind the gate signals 18 and 19, respectively, and referring to FIG. 6F, the gate signals 18 and 19 fall down behind the gate signals 21 and 20, respectively, by a time t1 predetermined by a delaying circuit 35. Consequently, the PMOS (A1) PMOS (A2) and the NMOS (B1)/NMOS (B2) do not turn on concurrently. Thus, the gate signals 18, 19, 20 and 21 which do not allow the PMOS (A1)/PMOS (A2) and the NMOS (B1) NMOS (B2) to turn on concurrently can be easily formed by the chopping wave 7 and the output voltage 12.

An error amplifier 51 for voltage feedback compares an applied voltage signal 55 of the discharge lamp 9 inputted to an inverting input terminal 51a with a preset value Vc, and outputs to a protection circuit 50 and the PWM circuit 8 an output voltage 52 in accordance with the voltage applied to the discharge lamp 9. The protection circuit 50 incorporates a comparator circuit (not shown), to which the output voltage 52 from the error amplifier 51 for voltage feedback, and a transformer output current signal 53 from a resistor 57 provided in series with the secondary side of the transformer 1 are inputted. The applied voltage signal 55 is formed such that a voltage at a connection of the capacitors 31 and 32 disposed at the output side of the transformer 1 is divided by resistors 58 and 59.

The error amplifier 51 for voltage feedback, when the applied voltage signal 55 is inputted to its inverting input terminal 51a, compares the applied voltage signal 55 with the preset value Vc, and outputs the output voltage 52 to the PWM circuit 8, and the voltage applied to the discharge lamp 9 is feedback-controlled. Accordingly, for example, when the discharge lamp 9 is not connected or poorly connected, an open voltage can be defined as a preset value. Also, when the discharge lamp 9 is not connected or poorly connected, it can happen that the output voltage at the secondary side of the transformer 1 shows an abnormal value. In such a case, the output voltage 52 of the error amplifier 51 for voltage feedback inputted to the protection circuit 50, and the transformer output current signal 53 are compared with the reference voltage of the comparator circuit (not shown) of the protection circuit 50, and if the output voltage 52 of the error amplifier 51 or the transformer output current signal 53 exceeds the reference voltage, then the logic circuit 29 is caused to stop its operation, whereby an excess current to the discharge lamp 9, and an excess voltage to the transformer 1 can be prevented. Further, the protection circuit 50, when the output voltage 12 of the error amplifier 11 is inputted, functions to prevent an excess current to the discharge lamp 9 and an excess voltage to the transformer 1. Thus, when an abnormal circumstance is detected at a side of the transformer 1 having the discharge lamp 9, the protection circuit 50 stops the operation of the logic circuit 29 thereby preventing damages to the transformer 1 and relevant circuits. In this connection, the protection circuit 50 is adapted to stop the operation of the logic circuit 29 only when a voltage exceeds a value predetermined by a built-in timer, whereby it is prevented from happening that the operation of the logic circuit 29 is falsely stopped when an excess voltage is instantaneously applied for some reasons.

Figure 7:
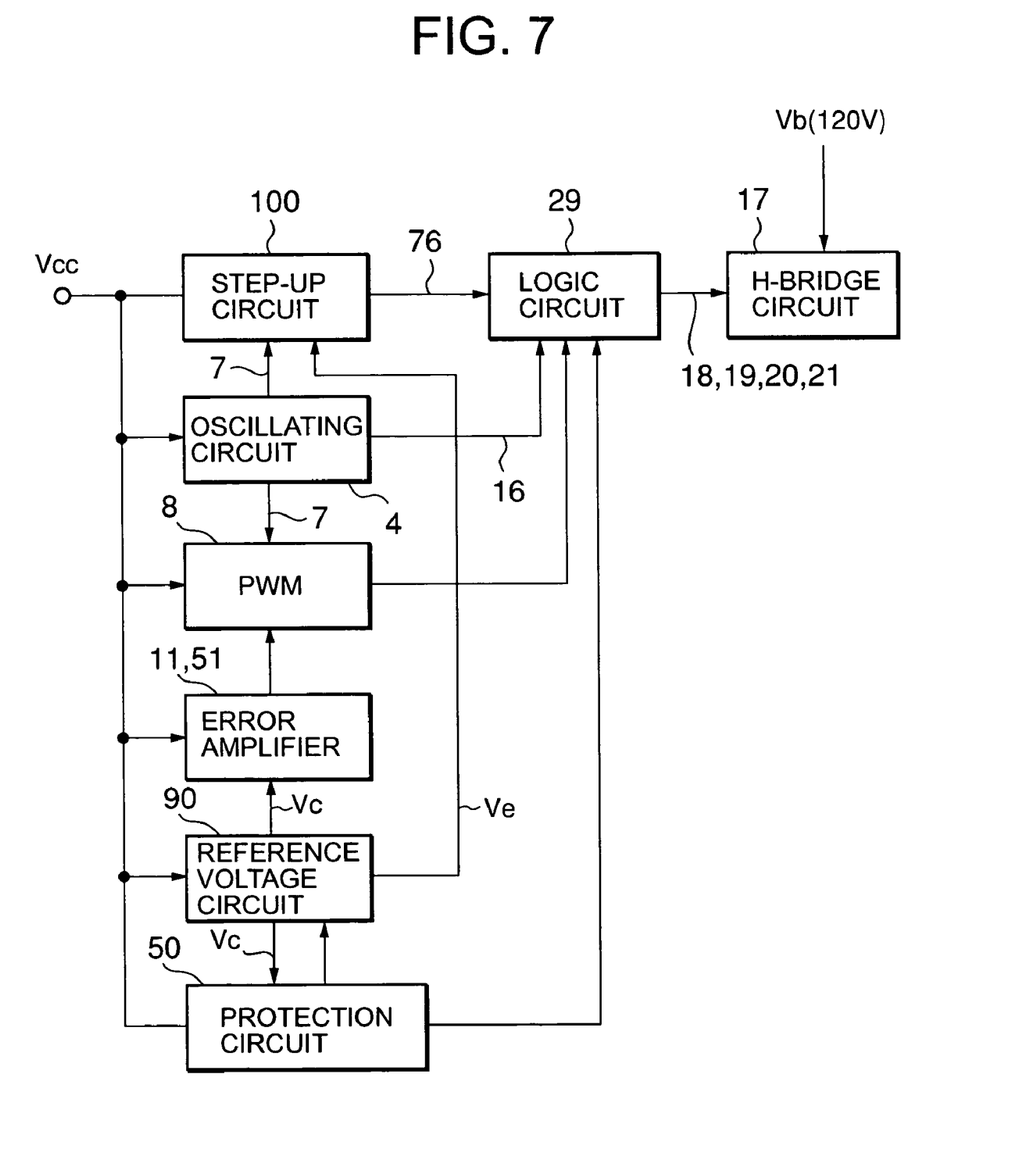
FIG. 7 is an explanatory chart of an operation of a protection circuit in the inverter circuit of FIG. 1.

Referring to FIG. 7, the supply voltage Vcc is supplied to the step-up circuit 100, the oscillating circuit 4, the PWM circuit 8, the error amplifiers 11 and 51, the protection circuit 50, and the reference voltage circuit 90. The supply voltage Vcc supplied to the reference voltage circuit 90 is converted into lower reference voltages Vc and Ve, and the reference voltage Vc is inputted to the error amplifiers 11 and 51, and the protection circuit 50 while the reference voltage Ve is inputted to the step-up circuit 100.

When the protection circuit 50 detects something abnormal at the side of the transformer 1 having the discharge lamp 9 connected, the logic circuit 29 is caused to stop its operation thereby preventing damages to the transformer 1 and relevant circuits. Especially, the H-bridge circuit 17, to which the supply voltage Vb of 120V for lighting the discharge lamp 9 is supplied, must be caused to infallibly stop its operation. In this regard, the protection circuit 50, when detecting something abnormal at the side of the transformer 1 provided with the discharge lamp 9, stops the operation of the reference voltage circuit 90 thereby reducing to a zero voltage the reference voltage Ve inputted to the step-up circuit 100, which stops an output of the supply voltage 76 supplied from the step-up circuit 100 to the logic circuit 29 resulting in surely stopping the operation of the logic circuit 29. Consequently, the operation of the H-bridge circuit 17 can be reliably stopped without fail.

In the inverter circuit according to the present invention, the circuits excluding the H-bridge circuit 17, the transformer 1, and the discharge lamp 9 may be constituted by inverter control IC's.

While the present invention has been illustrated and explained with respect to specific embodiments thereof, it is to be understood that the present invention is by no means limited thereto but encompasses all changes and modifications that will become possible within the scope of the appended claims.

What is claimed is:

1. An inverter circuit for lighting discharge lamps, the inverter circuit comprising:
    a) a transformer having a resonant circuit formed by a parasitic capacitance of a discharge lamp;
    b) an H-bridge circuit to drive a primary side of the transformer at a frequency which is less than a series resonant frequency of the resonant circuit, and at which phase difference in voltage and current at the primary side of the transformer falls within a predetermined range from its minimum;
    c) a logic circuit to generate, based on an output signal of an oscillating circuit, gate signals for driving the H-bridge circuit; and
    d) a step-up circuit to step up a DC supply voltage (Vcc) based on another output signal of the oscillating circuit, and to supply the logic circuit with the stepped up DC supply voltage as a supply voltage for generating the gate signals.

2. An inverter circuit for lighting discharge lamps according to claim 1, wherein the oscillating circuit is formed by the parasitic capacitance of the discharge lamp and an auxiliary capacitance parallel-connected to the discharge lamp.

3. An inverter circuit for lighting discharge lamps according to claim 1, wherein the step-up circuit comprises an error amplifier to output a voltage in accordance with an output voltage of the step-up circuit; and a PWM circuit to output a pulse voltage having a pulse width according to the voltage outputted from the error amplifier based on the output signal from the oscillating circuit.

4. An inverter circuit for lighting discharge lamps according to claim 3, wherein the step-up circuit further comprises a slow-start circuit connected to the PWM circuit.

5. An inverter circuit for lighting discharge lamps according to claim 4, wherein the slow-start circuit provided in the step-up circuit has a shorter rise time than a slow-start circuit to start the H-bridge circuit.

6. An inverter circuit for lighting discharge lamps according to claim 1, wherein the inverter circuit further comprises a protection circuit to stop an operation of the step-up circuit when detecting an abnormal circumstance at a side of the transformer provided with the discharge lamp.

* * * * *